United States Patent [19]

Beetner

[11] Patent Number: 4,484,220
[45] Date of Patent: Nov. 20, 1984

[54] TELEVISION MONITOR

[75] Inventor: Mike Beetner, Westport, Conn.

[73] Assignee: Idea Research Development Corp., Westport, Conn.

[21] Appl. No.: 306,862

[22] Filed: Sep. 29, 1981

[51] Int. Cl.³ ............................................. H04N 5/44
[52] U.S. Cl. .................................... 358/190; 358/188
[58] Field of Search ..................... 358/190, 194.1, 188, 358/114, 191.1; 455/231; 307/141, 222 R; 368/109

[56] References Cited

U.S. PATENT DOCUMENTS

| | | | |
|---|---|---|---|
| 2,855,993 | 10/1958 | Rahmel | 358/84 |
| 3,159,792 | 12/1964 | Metz | 307/222 R |
| 3,833,779 | 9/1974 | Leone | 307/141 |
| 3,979,601 | 9/1976 | Franklin | 307/141 |
| 4,213,058 | 7/1980 | Townsend | 307/141 |
| 4,218,871 | 8/1980 | Moritani et al. | 368/109 |
| 4,246,495 | 1/1981 | Pressman | 307/141 |
| 4,336,464 | 6/1982 | Weber | 307/141.4 |
| 4,348,696 | 9/1982 | Beier | 358/188 |

Primary Examiner—John C. Martin

[57] ABSTRACT

A monitor for restricting the operating time of electronic apparatus, such as a television set, is formed of an outer case of sufficiently small size to set atop a television set. The case includes on its outer surface a display of the time remaining of the predetermined operating time. The case also includes a chamber for enclosing time setting controls, the chamber having a locking cover for securing the controls from tampering by children. A slot in a wall of the chamber permits passing of a power cord of a television into the chamber while preventing the egress of the plug of the cord upon a locking of the cover to the chamber. A timer and power sensor within the case to measure the amount of time that power flows into the television, such power flow being an indication of operating time. A relay within the case switches off the power upon detection of a timing signal indicating conclusion of the predetermined operating time.

4 Claims, 9 Drawing Figures

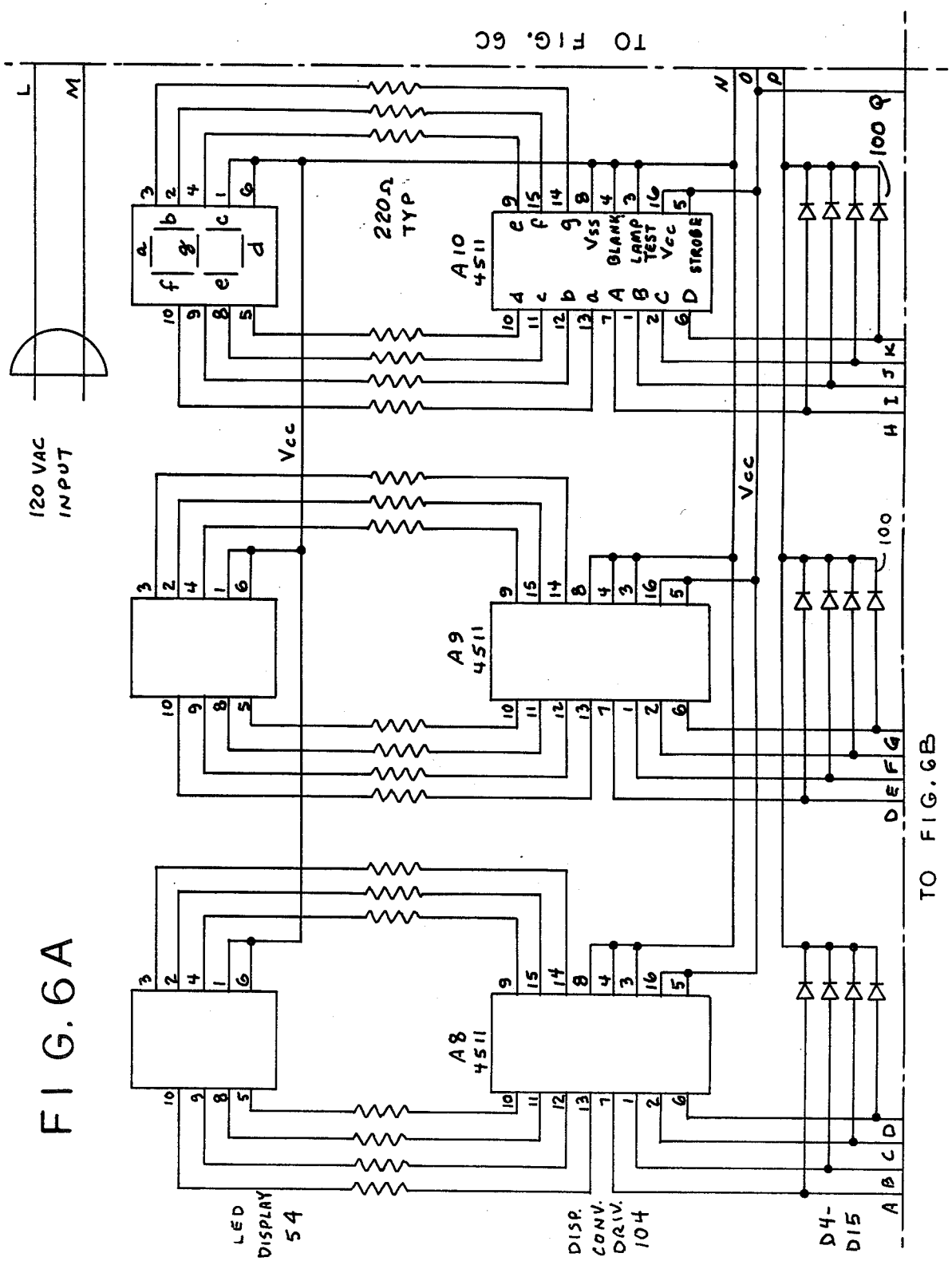

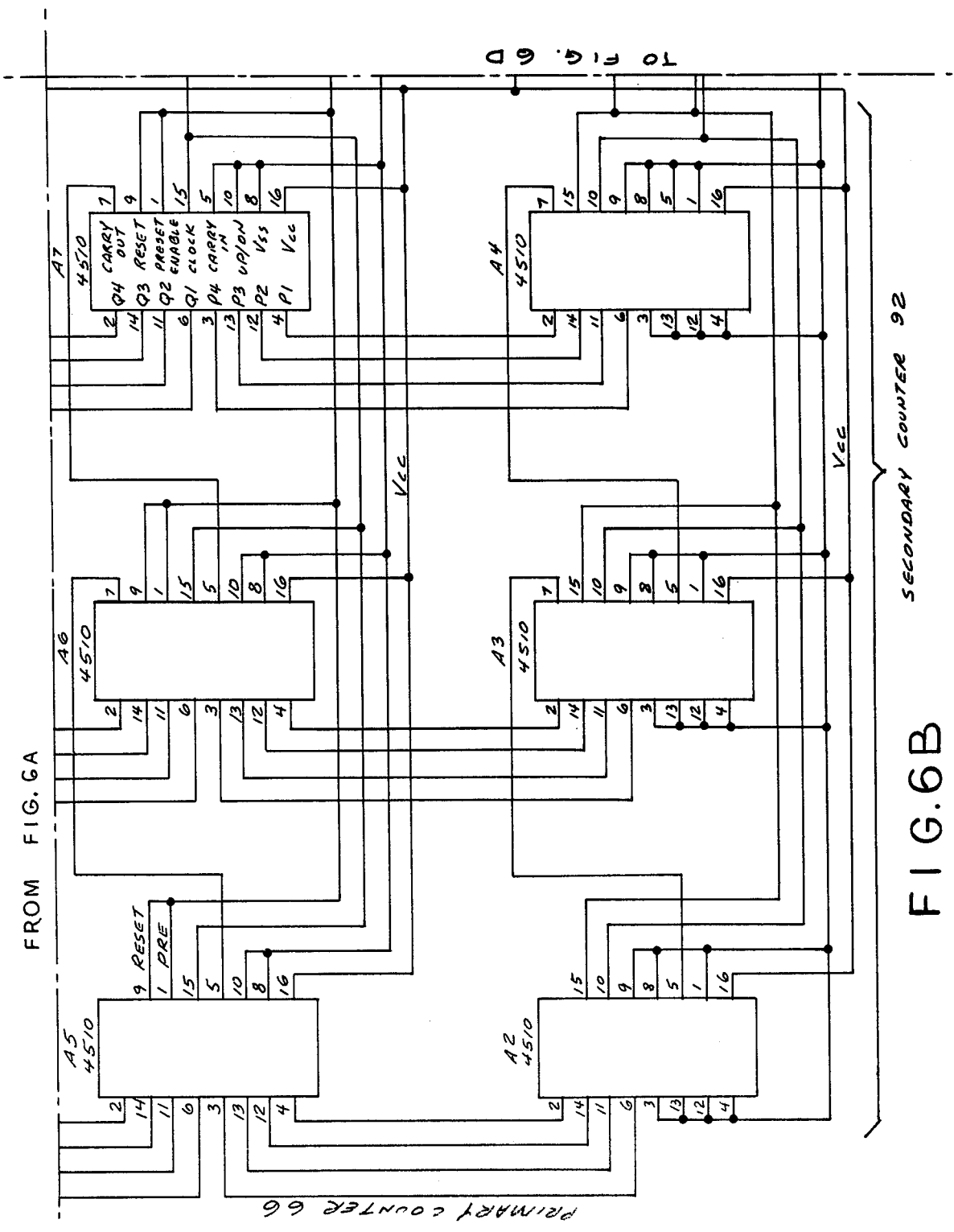

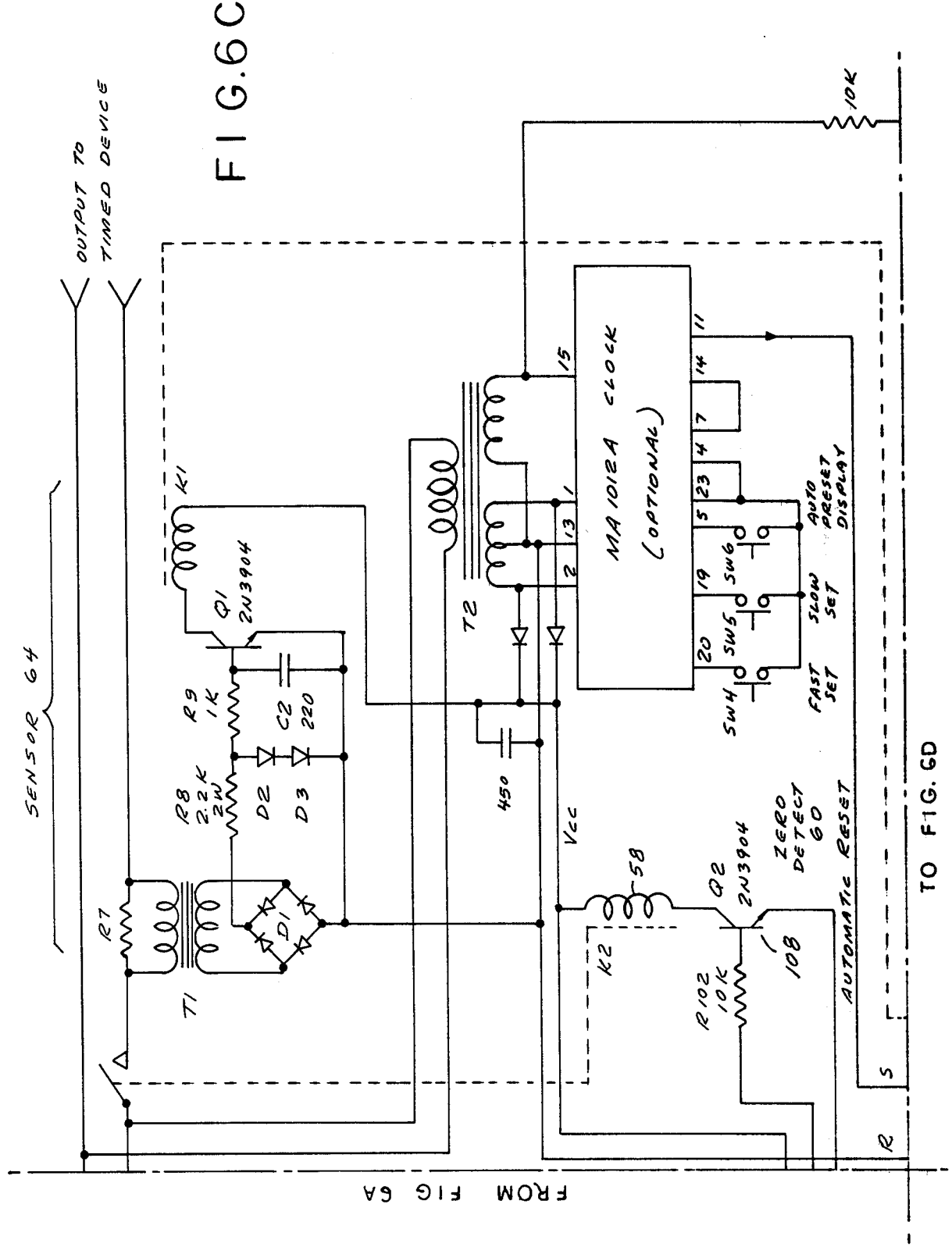

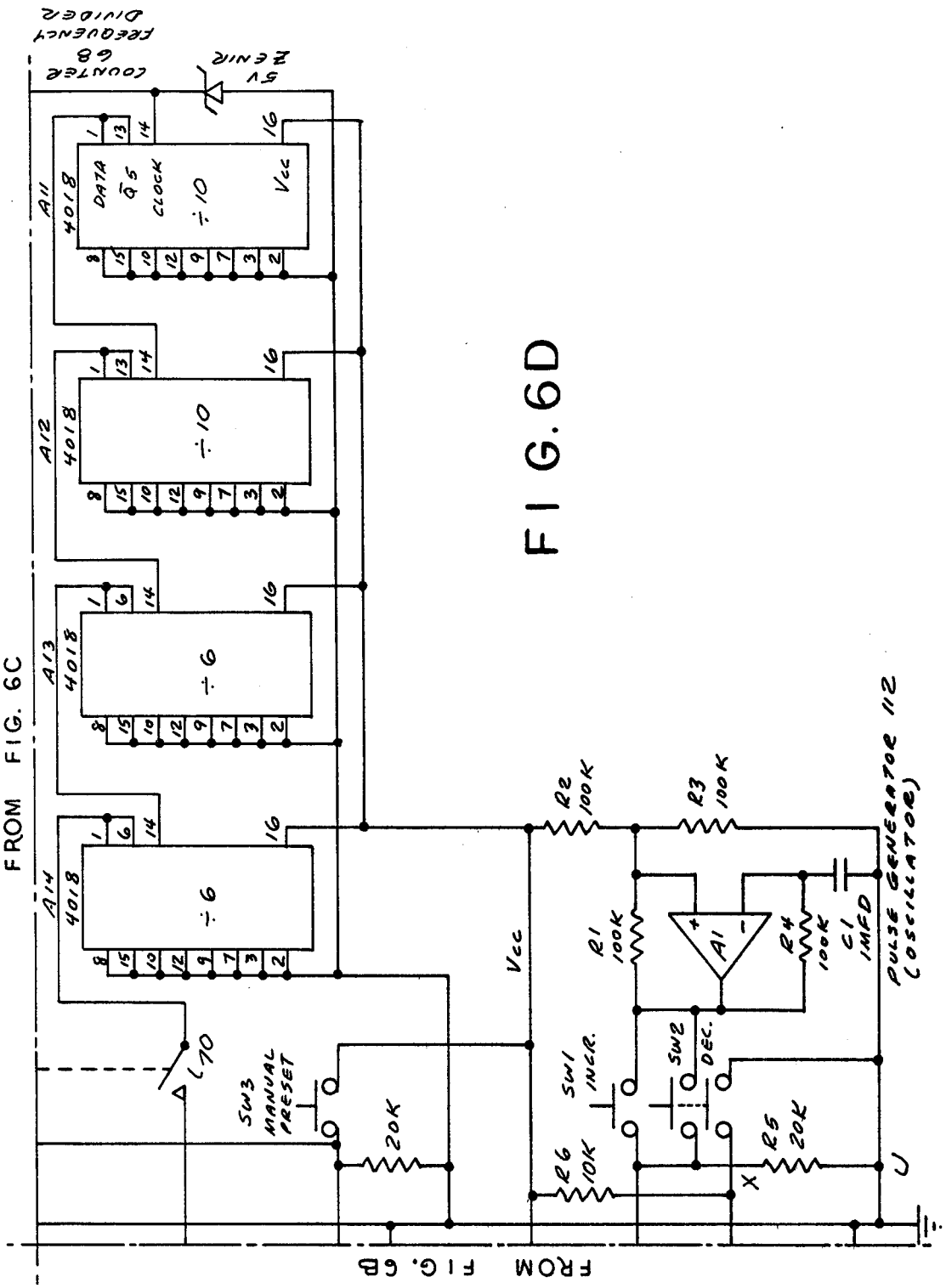

TELEVISION MONITOR

BACKGROUND OF THE INVENTION

This invention relates to the use of television, including electronic beams, by children and, more particularly, to the restriction of the viewing by a timing and power monitoring device which terminates the operation of a television set after a preset viewing interval.

Television is widely used by the general population, including both young and old. While some persons may view television relatively infrequently, others may view television many hours a day. Excessive viewing is often found among children.

Many parents are concerned by the amount of time that their children spend watching television. Their concern is well founded. Studies have shown that the average child will watch over 15,000 hours of television by high school graduation.

Experts tell us that excessive television viewing has two negative aspects. First, children are largely inactive during television viewing. Rather than getting fresh air and exercise and active outdoor play, studying, learning to socialize with others, reading, or engaging in arts and crafts, they sit passively in front of the television.

Secondly, parents are concerned with what their children watch. It has been estimated that, during those 15,000 hours of viewing while growing up, the child will witness over 18,000 murders. In recent years, television has come to rely more and more on sex and violence as standard fare. Experts warn of the dangers of this prolonged exposure to violence.

Parents do not want to completely eliminate television. Television does have some worthwhile programming. They do want to reduce the amount of television the child watches, and they want to control what the child watches. This is not an easy job. Parents usually do not even know how much time is spent watching television nor can they take the time to accurately monitor the viewing. If they did, they would likely be surprised to learn how much time is spent during the week. Parents, too often, as well, do not want to be the "bad guy" who enters the room and switches off the television or changes the channel. Children of divorced or working parents are often alone and unmonitored for much of their after-school viewing.

The inventor herein was a single parent with grade-school children. As such, his children were what is known as "latch-key" children. Latch-key children are children who arrive home from school in the afternoon to an empty house. Such children typically take refuge in television, postponing homework and household chores.

The inventor herein did not want to completely forbid television either after school or at night. The ideal is to teach children to become responsible, selective viewers by giving them the experience of selecting of what they would watch in advance. This selection is forced when the available viewing time is limited.

Heretofore, the only devices available were conventional mechanical timers for limiting the viewing of television. Such devices would permit the television to be turned on during only selective hours, and had no provision for security to prevent unauthorized use. It is believed that the best solution would be a device which would place an overall viewing limit that the child could budget with selective viewing.

A device is needed, therefore, which will help parents control television viewing and, at the same time, help the child to learn to become a selective discriminating television viewer.

SUMMARY OF THE INVENTION

The foregoing objective is attained and other advantages are provided by a television monitor which, in accordance with the invention, limits the amount of time a television can operate. In a preferred embodiment of the invention, the monitor is a small electronic device that sits atop the television and controls television viewing. The monitor allows the parent to establish a daily limit for television viewing. By monitoring power to the television set, the device monitors the amount of time the television is on. Because the child may watch anytime, the monitor encourages and teaches the child to plan the day's viewing in advance by selecting the best program to watch. Where there is more than one child, this planning will provide the child with group discussion, decision-making, and a comparison of experiences.

The monitor includes a locked access panel whereby the parent may override the monitor with a key. This allows the parent to use the television at their discretion (for example, after the child has gone to bed), even if the allocation time has been used. The key-lock arrangement also secures the television power cord to prevent children from by-passing the monitor.

A prototype of the monitor worked well. The children had an unwavering limit that was entirely accurate. It was the monitor that turned off the television at the end of the allotted time and not the parent. The children spent time planning their viewing and discussing among themselves and with their parent, the relative values of different shows. The parents felt secure in knowing that the viewing time rule was being rigidly and impartially enforced.

BRIEF DESCRIPTION OF THE DRAWINGS

The foregoing features and other aspects of the invention are explained in the following description, taken in connection with the accompanying drawings wherein:

FIGS. 6A-D taken together are a schematic electrical diagram of the monitor, individual lines being labeled to facilitate the viewing of the connections between the lines of one of the figures with the lines of the second of the figures.

DESCRIPTION OF THE PREFERRED EMBODIMENT

Figure 1:
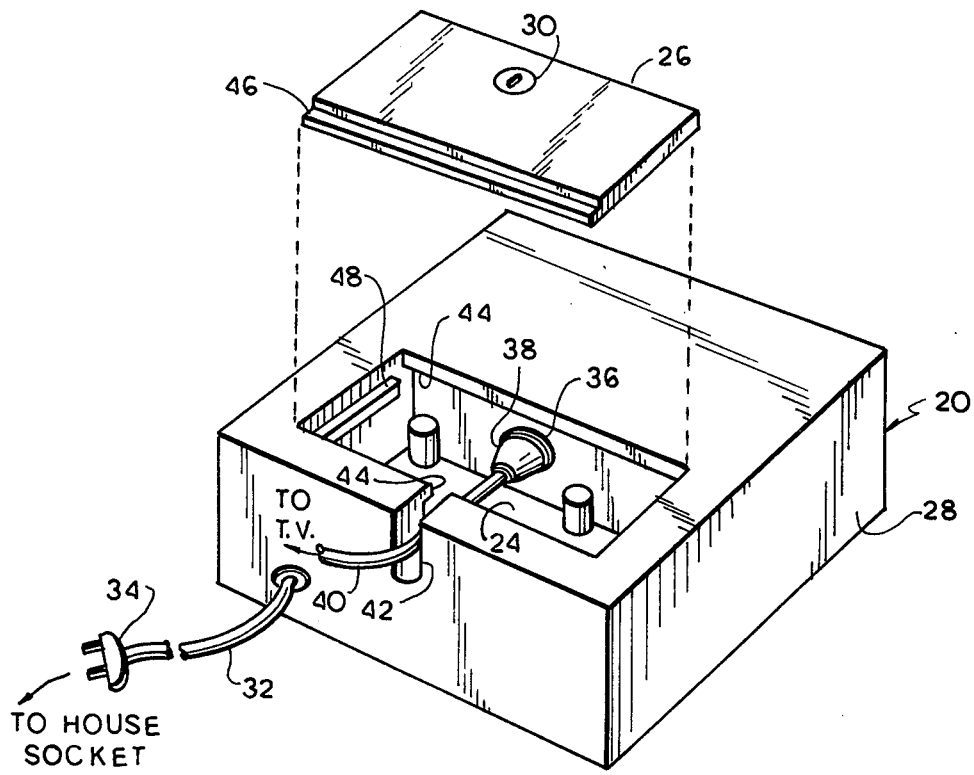
FIG. 1 is a simplified isometric view of the rear portion of the monitor of the invention with the locked access panel being presented in exploded view to show interior controls and the connection for the television power cord.
Figure 2:
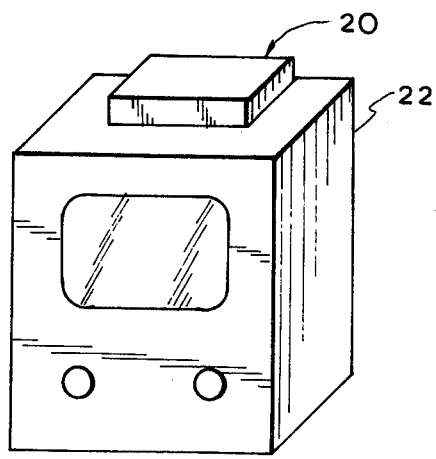
FIG. 2 is a stylized view of a television set with the monitor sitting on top of the set.

Referring now to FIGS. 1-4, the monitor 20 of the invention is connected to a television 22 for restricting the total viewing time. The monitor 20 is of much smaller size than the television 22 to permit the convenient emplacement of the monitor 20 atop the television 22. Controls for the monitor 20 are set within a cavity 24 towards the rear of the monitor 20 and secured by an access panel 26 which is locked to the outer case 28 of the monitor 20 by a lock 30. By way of example in the simplified view of FIG. 1, two such controls designated SW1 and SW2 are shown, it being understood that still further controls are present as will be described with reference to FIGS. 5–6.

The monitor 20 includes a power cord 32 terminating in an electrical plug 34 for connection with a wall electric outlet (not shown) whereby electric power is applied to the monitor 20. The monitor 20 includes a socket 36 located within the cavity 24 for mating with the plug 38 of a power cord 40 of the television 22. Electric power is coupled from the monitor 20 to the television 22 by the power cord 40.

In accordance with a feature on the invention, a slot 42 is placed within the back wall of the case 28 to permit passing of the cord 40 into the cavity 24 while the plug 38 is locked therein by the panel 26 and the lock 30. The width of the slot 42 is much narrower than the diameter of the plug 38 to prevent withdrawal of the plug 38 from the monitor 20 without removal of the locked panel 26. Thereby, children cannot disengage the monitor 20 from the cord 40 for unauthorized viewing of television programs.

For securing the panel 26 to the case 28, a lip 44 is provided in the front wall and in the back wall of the cavity 24 for engagement, respectively, with a bolt (not shown) of the lock 30 and a tongue 46 at the rear edge of the panel 26. Ledges 48 on the side walls of the cavity 24 support the panel 26. Removal of the panel 26 is accomplished by unlocking the lock 30 with a resultant withdrawal of the tongue, thereby freeing the panel 26 from the lip 44 at the front wall of the cavity 24. The panel 26 can then be pivoted about the tongue 46 and the lip 44 at the back wall of the cavity 24.

Figure 3:
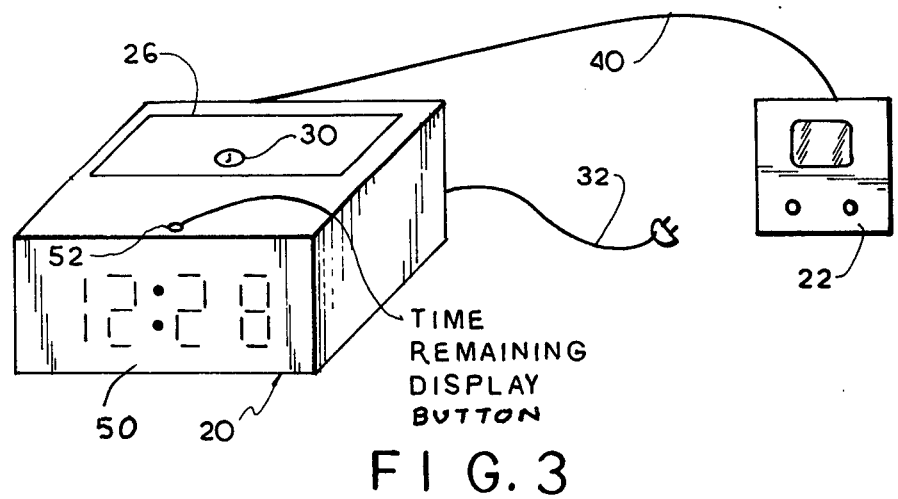
FIGS. 3 and 4 show stylized views of alternate embodiments of the monitor.
Figure 4:
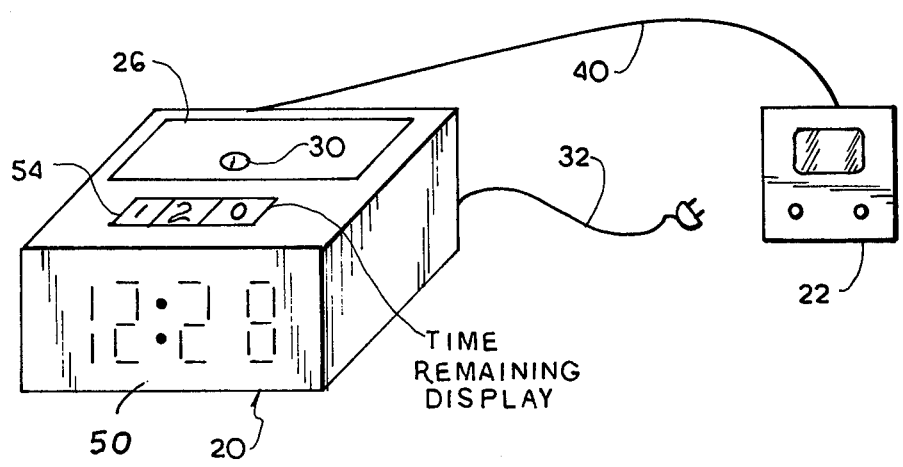

A display is provided for presenting the time of the day, as well as the time remaining for viewing of the television programs. In one embodiment of the monitor 20, as shown in FIG. 3, one display 50 is time shared between the time of day and the time remaining for viewing. A switch operated by a button 52 selects the desired function of the display 50 as will be described with reference to FIG. 5. Alternatively, as shown in FIG. 4, two separate displays may be utilized, namely, the foregoing display 50 for showing the time of the day, and a second display 54 located on the top of the monitor 20 for presenting the time remaining for viewing the television programs.

Figure 5:
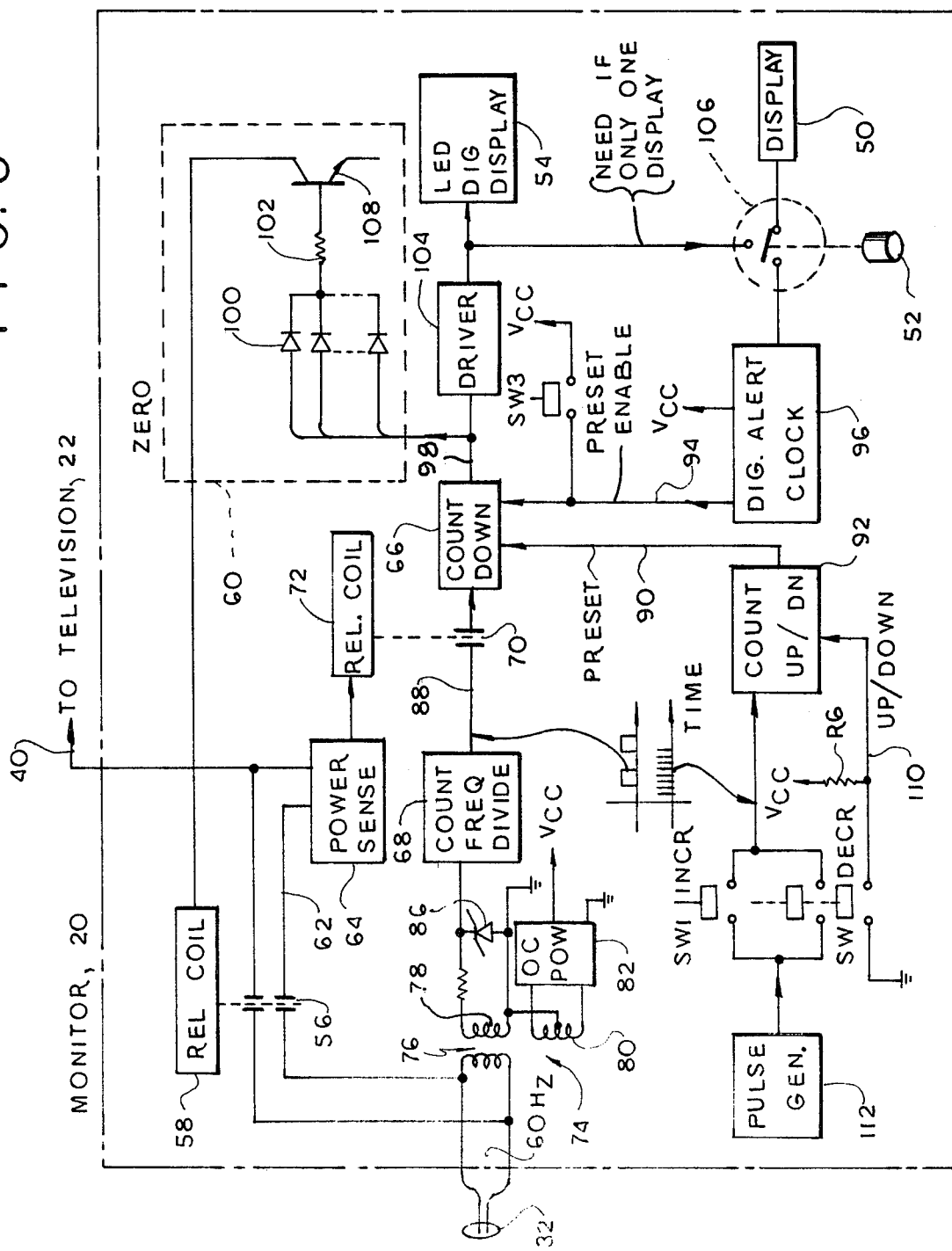
FIG. 5 is a flocked diagram of the monitor.

Referring now to FIGS. 5 and 6, the monitor 20 comprises electrical circuits coupled between the power cords 32 and 40. AC (alternating current) electric power at a frequency of 60 Hz (Hertz) is brought in by a cord 32, and coupled to cord 40 via normally-opened contacts 56 of a relay 58. A coil of the relay 58 is energized by a detector 60 upon its detection of the digits of a timing signal indicating zero viewing time remaining. One electrical conductor 62 of the cord 32 passes through a sensor 64 of electric power in route to the cord 40. Thereby, the fact of the utilization of electric power by the television 22 activates the monitor 20 to measure the elapsed time of television viewing.

The timing function of the monitor 20 is accomplished by means of a counter 66 counting clock pulses produced by a second counter 68. The counter 68 is activated by the AC power and serves as a frequency divider. The clock pulses of the counter 68 are coupled via the normally-open contacts 70 of a relay 72 to the counter 66. The coil of the relay 72 is energized by the power sensor 64 for closing the contacts 70 so that the counter 66 counts only when the sensor 64 is detecting the presence of power flowing into the television 22, the counting terminating upon a termination of power flow into the television 22.

The coupling of the counter 68 to the AC power of the cord 32 is accomplished by a power circuit 74 comprising a step-down transformer 76 having two output windings 78 and 80, the latter having a grounded center tap connecting to the winding 78. The winding 80 connects with and energizes a power supply 82 which converts AC power to DC (direct current) power at terminal Vcc which, in turn, energizes the counters 66 and 68 and other components of the monitor 20. A resistor 84 and zener diode 86 are serially connected across the terminals of the winding 78 to provide a pulsating voltage across the terminals of the diode 86. Since the zener diode 86 conducts at near-zero voltage drop in one direction, and at the zener voltage breakpoint in the reverse direction, the AC voltage appearing across the winding 78 is converted in a succession of substantially square-wave pulses across the terminal of the diode 86. These pulses serve as clock pulses and are coupled to the counter 68. The counter 68 counts the clock pulses modulo 60 to provide output pulses on line 88 to the counter 66 at a rate of one pulse per second, as depicted in the upper trace of a graph 89 adjacent the line 88.

The counter 66 counts down from a preset value to zero, the preset value being a digital signal applied via line 90 by a counter 92. The counter 66 is preset in response to an enabling signal applied along line 94 by a switch SW3 or, optionally, by a digital alarm clock 96. The enabling signal on line 94 is established by a momentarily connecting line 94 to Vcc as is done by the switch SW1. The output count of the counter 66 appears on line 99 which represents a set of conductors corresponding to each digit of the count. Individual ones of the conductors may be seen fanning out from the line 98 in the detector 60 wherein the conductors are coupled individually by diode 100 to a resistor 102. The conductors carrying the output count on line 98 are also coupled via a driver 104 to the display 54. The driver 104 drives the display 54, shown also in FIG. 4, to present instantaneous values of the count of the counter 66. Since the counter counts down, and only counts while there is power flowing to the television 22, the count displayed on the display 54 is the time remaining for viewing television programs.

The display 50, also shown in FIG. 4, is coupled by a switch 106 to the digital alarm clock 96. A switch 106 is activated by the button 52, shown in FIG. 3. As has been noted hereinabove with reference to the embodiments of the monitor 20 presented in FIGS. 3 and 4, the embodiment of FIG. 3 utilizes the single display 50 for presenting both the time of day the the time remaining for viewing television programs. The button 52 and the switch 106 serve to switch the display 50 between the output terminal of the alarm clock 96 and the output terminal of the driver 104. Accordingly, the display 54 is not utilized in the embodiment shown in FIG. 3. However, in the embodiment of FIG. 4 wherein both the displays 50 and 54 are utilized, then the button 52 and the switch 106 may be deleted, with the display 50 being coupled directly to the output terminal of the alarm clock 96. Thereby, the display 50 always presents the time of day as provided by the alarm clock 96, while the display 54 presents the time remaining for viewing television programs as is provided by the counter 96 via the driver 104. Both the displays 50 and 54 are conveniently fabricated of LED digital displays as are commonly utilized in electronic clocks.

The zero detector 60 comprises the foregoing diode 100 and the resistor 102, as well as a transistor 108. The base terminal of the transistor 108 is coupled to the resistor 102 while the collector terminal of the transistor 108 connects with the coil of the relay 58. When any one of the conductors, or a plurality of the conductors, of line 98 apply a relatively high signal voltage, corresponding to a logic 1, base current flows from the corresponding diode, or diodes, 100 via the resistor 102 to activate the transistor 108 to drive current through the coil of the relay 58. The emitter terminal of the transistor 108 is understood to be coupled to ground, thereby completing the circuit for the coil current of the relay 58. When the counter 56 attains a count of zero, all of the foregoing conductors are applying a relatively low voltage, corresponding to a logic 0, which terminates base current and cuts off the transistor 108 so that no more current flows in the coil of the relay 58. Thereby, the relay 58 is activated only during such period of time as is permissible for the viewing of television programs, the relay being deactivated at the conclusion of the relay 58, the contacts 56 are opened with the result that no further power flows from the power cord 32 via the cord 40 to the television 22.

The counter 92 which generates the preset signal is capable of counting both up and down in accordance with the logic level of voltage on line 110. The counter 92 counts clock pulses produced by a pulse generator 112 and applied by switches SW1 or SW2 and line 114 to an input terminal of the counter 92. The clock pulses on line 114 occur at an exemplary rate of 10 pulses per second as depicted in the lower trace of the graph 89, this being ten times the clock rate of the aforementioned signal on line 88. The count of the counter 92 remains fixed until such time as either the switch SW1 or the switch SW2 is manually depressed. The switches are located in the cavity 24 of FIG. 1. When the switch SW1 is depressed, the counter 92 counts up. The switch SW2 contains two sections ganged together. When the switch SW2 is depressed, the lower section grounds the line 110 causing the counter 92 to count down. Thereby, the counter 92 can provide any desired values for presetting the viewing time of the counter 66.

In operation, therefore, the monitor 20 restricts the viewing of the television programs by measuring the elapsed time of power flow through the power cord 40 to the television 22. In accordance with the invention, the counter 66 counts down from a preset amount of viewing time. The clock pulses to be counted by the counter 66 are obtained from the 60 Hz AC power line to insure a precise time base for measurement of the viewing time. The time of day and the unused viewing time can be displayed via the displays 50 and 54 or, alternatively, by the single display 50 in conjunction with the selector switch 106. Termination of the power flow to the television 22 is accomplished by the deenergization of the relay 58 by the detector 60 in response to the detection of zero remaining viewing time from the counter 66. Presetting of the counter 66 with the prescribed amount of viewing time can be accomplished without the use of digiswitches or dials by the use of the pulse generator 112, switches SW1 and SW2, and the counter 92. During the presetting, the instantaneous reading of the preset amount on line 90 can be obtained by manually holding down the switch SW3 in which case the output count of the counter 66 on line 98 is equal to the amount on line 90. The count on line 98 is presented by the driver 104 to the desired display, for viewing of the instataneous reading of the preset amount on line 90. The monitor 20 is tamper-proof due to the locked access panel 26 which secures control of the monitor 20 from children, it being also recalled that the plug 38 of the television power cord 40 is also secured within the cavity 24 by the slot 42.

Referring more specifically to the schematic diagram of FIGS. 6A-D, the foregoing operation of the monitor 20 is explained in greater detail. The counter 66 comprises a three-digit presetable counter which produces a three-digit binary-coded-decimal (BCD) output. Correspondingly, the display driver 104 and the display 54 each comprise three sections, the output of the counter 66 being fed to the corresponding three sections of the driver 104 which convert the BCD information into the form required for driving the LED (light emiting diode) circuit of the digital display 54. Also, the counter 92 comprises three sections for generating any desired viewing time from 001 to 999 minutes. Both of the counters 66 and 92 utilize for their individual stages three cascaded type 4510 up-down counters. Type 4510 is readily available commercially, being obtained by way of example from RCA Model CD 4510, from Motorola as Model MC14510BCP and from National Semiconductor as Model No. CD4510BC.

The pulse generator 112 may be obtained commercially, or, alternatively, constructed as shown in the schematic diagram. Thus, the generator 112 is constructed as a relaxation oscillator comprising an amplifier A1, or resistors R1, R2, R3, and R4, and a capacitor C1 which are connected in a well known circuit. The output signal of the pulse generator 112 is fed to the counter 92, the three stages of which are identified in the schematic diagram by the legends A2, A3 and A4. When the switch SW1 is used for incrementing the count, the switch SW1 closes the circuit to the clock inputs of the cascaded counter states A2, A3 and A4 to apply the clock pulses from the generator 112. The up-down logic input of each state A2, A3 and A4 is terminal #10. These terminals are tied together and connected to Vcc through R6 so that they are in a high state. Thus, the counter 92 will increment. If it is desired to decrement the counter, one pole of the switch SW2 applies the clock pulses to the counter stages A2, A3 and A4 in the identical fashion as described for the switch SW1. The other pole of the switch SW2 connects terminals #10 in each of the stages A2, A3 and A4 to ground so as to be in a low state and cause the counter to decrement.

Each of the type 4510 counter stages has four output lines (terminals 6, 11, 14 and 2) which comprise the BCD logic. These lines connect from each of the type 4510 stages and the counter 92 to the "jam" inputs (terminals 4, 12, 13 and 3) of the corresponding type 4510 stages in the counter 66.

The recessed input of the type 4510 stage is terminal #9, and the preset enable is terminal #1. When these two inputs are brought simultaneously high, the type 4510 stage will set to whatever value is impressed upon the "jam" inputs. The reset and preset enable inputs of stages A5, A6 and A7 of the counter 66 are all tied together and are connected to Vcc through the normally opened SPST (single pole single throw) push button switch SW3. Thus, whenever SW3 is activated, the counter 66 will be preset to whatever value is dictated by the counter 92. While the counter 92 is being set, its value may be monitored on the digital display 54 by actuating SW3.

The BCD outputs from stages A5, A6 and A7 of the counter 66 are fed, respectively, to the stages A8, A9 and A10 of the driver 104, each of these stages being type 4511 BCD to seven-segment display converter/drivers. The type 4511 device is readily available commercially from various sources for example, RCA as Model CD4511, from Motorola as Model MC14511BCP, and from National Semiconductor as Model CD4511BC. The seven output signals from each type 4511 stage are connected through 220 ohm limiting resistors to the seven-segment LED display stages of the display 54. The LED display in each stage of the display 54 may be chosen on a basis of size, appearance, convenience and economy as long as it is of the common enode configuration. Suitable types available commercially would be Hewlett Packard Model 5082-7730 or Model 5082-7750.

The counter 68 which serves as the frequency divider comprises four counter stages identified as A11 through A14 in the schematic diagram. The states A11 through A14 are cascaded ten-stage Johnson counters which produce the one pulse per minute clocked signal for the counter 66. The stages A11 and A12 are configured to divide by ten; the stages A13 and A14 are configured to divide by six. Thus, the 60 Hz input from the power cord 32 is divided by $10 \times 10 \times 6 \times 6$, this being a division by 3600, to produce an output pulse rate of one pulse per minute. Each of the stages A11–A14 may be a type 4017 or 4018 counter, the counter type 4017 being commercially available from RCA as Model CD4017, from Motorola as Model MC140178, and from National Semiconductor as Model CD4017BC.

The power sensor 64 comprises a resistor R5, a transtransformer T1, a bridge rectifier D1, a filter circuit formed of two resistors R8 and R9 and a capacitor C2, a transistor Q1, and two serially connected diodes D2-3. The transistor Q1 is serially connected by its collector terminal to the coil of the aforementioned relay 72 shown also in FIG. 5. The resistor R5 is in series with the television or other electrical load which is being timed. When the load is energized, a small AC voltage appears across the resistor R5 which is coupled by the transformer T1 to the bridge rectifier D1. The rectified signal is filtered by resistors R6-7 and capacitor C2 and causes the transistor Q1 to conduct. The relay 72 is energized by the transistor Q1 to close the contacts 70 thereby permitting the pulses of the counter 68 to be coupled to the counter 66. The diodes D2 and D3 act as an over-voltage protector for the transistor Q1.

With respect to the construction of the zero detector 60, each of the four output terminals in each type 4510 stage of the counter 66 is coupled through an isolating diode 100 and resistor 102 to the transistor 108. As long as there is a voltage from one or more of the sixteen BCD outputs, the transistor 108 will conduct and the relay 58 will be energized so as to allow the television 22 (or other device being timed) to receive power. When the counter 66 reaches zero, there are no output voltages present from the individual stages of the counter 66 and the relay 58 de-energizes with a disconnecting of power from the television (or other device) being timed. Power may be re-established by actuacting switch SW3 and presetting the counter 66 to a count corresponding to the number of minutes that the television 22 is to be operable.

With respect to the optional feature of presetting the counter 66 automatically at any desired time of the day by means of the digital alarm clock 96, the clock used for this purpose is a commercially made clock chip such as that made by the National Semiconductor Model MA1012A clock chip. Such a clock chip provides an alarm output in the form of a positive output voltage of four to seven volts DC, or a pair of relay contacts through which a positive DC voltage may be switched. One advantage of the chip type MA1012A is that a transformer is normally supplied with this chip from which power may be drawn to other components of the monitor 20 such as the counters, display and related circuitry.

It is to be understood that the above described embodiments of the invention are illustrative only and that modifications thereof may occur to those skilled in the art. Accordingly, this invention is not to be regarded as limited to the embodiments disclosed herein, but is to be limited only as defined by the appended claims.

What is claimed is:

1. A monitor for restricting the operating time of electronic apparatus accessible to children comprising:
   a sensor of power flow to said apparatus;
   a timer presettable to a predetermined amount of said operating time, said timer being activated by said sensor upon a sensing of said power flow;
   means for switching said power, said switching means being responsive to a timing signal of said timer for terminating said power flow upon the conclusion of said predetermined operating time;
   means coupled to said timer for presetting the length of said operating time;
   wherein said timer comprises a counter counting down in response to clock pulses incident upon said counter, and wherein said presetting means comprises:
   an up-down counter, a pulse generator, and switching means coupling pulses of said generator to said up-down counter; said pulse switching means including switch contacts for activating an up-down control terminal of said up-down counter; said presetting means further including means for enabling a presetting of said down counter, said up-down counter being coupled to a preset terminal of said down counter whereby the starting count of said down counter is preset to the value of the output count of said up-down counter.

2. A monitor according to claim 1 wherein said enabling means comprises a switch for manually enabling said down counter and a clock means for automatically presetting said down counter, said clock means including means for displaying the time of day.

3. A monitor according to claim 2 further comprising means coupled between said timer and said display of said clock means for alternatively displaying the time remaining in said predetermined operating time along with said time of day.

4. A monitor for restricting the operating time of electronic apparatus accessible to children comprising:
   a sensor of power flow to said apparatus, said sensor being coupled to a power cord of said apparatus, said sensor comprising a transformer with a resistor coupled across input terminals of said transformer and being serially connected within a conductor of said power cord for developing a voltage drop proportional to current in said conductor, said sensor further comprising a diode bridge circuit coupled across an output terminal-pair of said transformer, a transistor, and a resistor-capacitor filter coupled between said diode bridge circuit and said transistor and a relay having a coil energized by current from said transistor;

a timer presettable to a predetermined amount of said operating time, said timer comprising a counter which counts down in response to clock pulse incident upon a clock input terminal of said counter, said counter being coupled at its clock input terminal to contacts of said relay of said sensor for being activated by said sensor upon a sensing of said power flow;

means for switching said power, said switching means being responsive to a timing signal of said timer for terminating said power flow upon the conclusion of said predetermined operating time;

means coupled to said timer for displaying a remaining portion of said operating time;

means coupled to said timer for presetting the length of said operating time, said timer comprising a counter counting down in response to clock pulses incident upon said counter, said presetting means comprising: an up-down counter, a pulse generator and switching means coupling pulses of said generator to said up-down counter; said pulse switching means including switch contacts for activating an up-down control terminal of said up-down counter; said presetting means further including means for enabling a presetting of said down counter, said up-down counter being coupled to a preset terminal of said down counter whereby the starting count of said down counter is preset to the value of the output count of said up-down counter;

said presetting means further comprising clock means for automatically presetting said down counter, said clock means including means for displaying the time of day;

means coupled between said timer and said display of said clock means for alternatively displaying the time remaining in said predetermined operationg time along with said time of day;

means coupled between said timer and said switching means for detecting zero remaining time in said predeterminted operating time, said detecting means comprising a transistor for energizing said switching means, and a diode fan-in circuit coupling said diodes from respective stages of said timer to a terminal of said transistor; and wherein said switching means comprises a relay having a coil energized by current of said transistor; and wherein said power is conducted to said switching means by an AC current and an electric conductor, said timer further comprising clock pulse means being coupled between said conductor and said counter, the clock input terminal of said counter being coupled to said clock pulse means via said contacts of said sensor relay, said clock pulse means comprising: a transformer and a series connections of a resistor and a zener diode connected across a winding of said transformer, a counter serving as a frequency divider, an input terminal of said frequency-divider counter being coupled to a voltage of said zener diode for generating a set of clock pulses at a frequency lower than the repition of pulses of said AC current; and said monitor further comprising a case for enclosing said sensor, said timer and said switching means, said case including means accessible by a lock for securing a terminus of a power cord of said apparatus to said switching means.

* * * * *